United States Patent [19]
Thomas

[11] Patent Number: 4,937,968
[45] Date of Patent: Jul. 3, 1990

[54] MOUSETRAP

[76] Inventor: Henry M. Thomas, 7701 Cantrell Rd., Little Rock, Ark. 72217

[21] Appl. No.: 424,189

[22] Filed: Oct. 19, 1989

[51] Int. Cl.⁵ .............................................. A01M 23/08
[52] U.S. Cl. ........................................................ 43/69
[58] Field of Search .................... 43/58, 60, 61, 69, 73

[56] References Cited

U.S. PATENT DOCUMENTS

| | | | |
|---|---|---|---|
| 1,436,272 | 11/1922 | McElfresh | 43/69 |
| 1,738,623 | 12/1927 | Westerlund | 43/69 |
| 4,566,218 | 1/1986 | Kurosawa et al. | 43/58 |

Primary Examiner—M. Jordan
Attorney, Agent, or Firm—Fleit, Jacobson, Cohn, Price, Holman & Stern

[57] ABSTRACT

A mousetrap including a supporting base with an upstanding support, a container of water on the base, a pivotal platform overlying the container of water to enable a plurality of mice to be trapped, an entrance area including a bait box and entrance door and platform having a flange at one edge of the entrance end thereof, to hold the door in open position, an escape tube on the support which extends vertically from the entrance area to a point above the pivotal platform. In use, a mouse will be trapped in the bait box area after entry by the door being closed and then be trapped in the escape tube during vertical climbing along the tube to prevent downward return movement of the mouse with the only exit for the mouse being onto the platform whereby the weight of the mouse will pivot the platform and dump the mouse into the water in the container with the platform opening the door and returning to a position for receiving another mouse from the escape tube.

8 Claims, 3 Drawing Sheets

MOUSETRAP

BACKGROUND OF THE INVENTION

1. Field of the Invention

The present invention generally relates to a mousetrap and more specifically a mousetrap including a supporting base with an upstanding support, a container of water on the base, a pivotal platform overlying the container of water to enable a plurality of mice to be trapped, an entrance area including a bait box and entrance door and platform having a flange at one edge of the entrance end thereof to hold the door in open position, an escape tube on the support which extends vertically from the entrance area to a point above the pivotal platform. In use, a mouse will be trapped in the bait box area after entry by the door being closed and then be trapped in the escape tube during vertical climbing along the tube to prevent downward return movement of the mouse with the only exit for the mouse being onto the platform whereby the weight of the mouse will pivot the platform and dump the mouse into the water in the container with the platform opening the door and returning to a position for receiving another mouse from the escape tube.

2. Information Disclosure Statement

Various efforts have been made to effectively but yet humanely trap mice. While various arrangements have been provided to trap mice without subjecting the mice to prolonged suffering, the primary developments in this field relate to various means of quickly terminating the life of a single mouse. Previously known devices do not include the specific structure of the present invention which enables a plurality of mice to be trapped and quickly drowned.

SUMMARY OF THE INVENTION

An object of the present invention is to provide a mousetrap including a tank or container of water, a pivotal platform overlying the container of water and a unique structure to enable a mouse to enter a bait box area, move upwardly through a tube and climb onto the platform with the platform then being pivoted by the weight of the mouse to dump the mouse into the water in the tank with the platform then pivoting automatically to a normal position with a structure being provided to reset the remainder of the trap for entrance of another mouse.

Another object of the invention is to provide a mousetrap in accordance with the preceding object in which the bait box is provided with a vertically movable entrance door and a pivotal entrance platform having a flange thereon with the entrance door normally being retained in vertically elevated open position but being released when the mouse steps on the entrance platform inwardly of the door and flange as the mouse enters the bait box area with the door being dropped to a closed position in response to movement of the entrance platform to prevent exit of the mouse from the doorway.

A further object of the invention is to provide a mousetrap in accordance with the preceding objects in which the bait box has a vertically extending escape tube communicated therewith in which a mouse can climb upwardly and which includes a trap member that will automatically fall into place after the mouse has passed upwardly to prevent the mouse from returning down the tube thereby making certain that the mouse will exit onto the pivotal dumping platform and drop into the water tank.

A still further object of the invention is to provide a mousetrap in accordance with the preceding objects in which the pivotal dumping platform is connected to the vertically elevatable door by a lift structure to elevate the door to an open position when the dumping platform is pivoted downwardly by the weight of the mouse as the mouse is dropped into the water in the tank with the flange on the entrance platform then latching the vertically movable door in elevated position until a second mouse enters the doorway onto the entrance platform which will again release the vertically movable door so it will drop to closed position by gravity to trap the second mouse.

Yet another object of the invention is to provide a mousetrap which is simple in construction, capable of trapping and drowning a plurality of mice in water and easily maintained by periodic dumping of the water in the tank and refilling with clean water and at the same time disposing of any mice that may be in the water tank or container.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
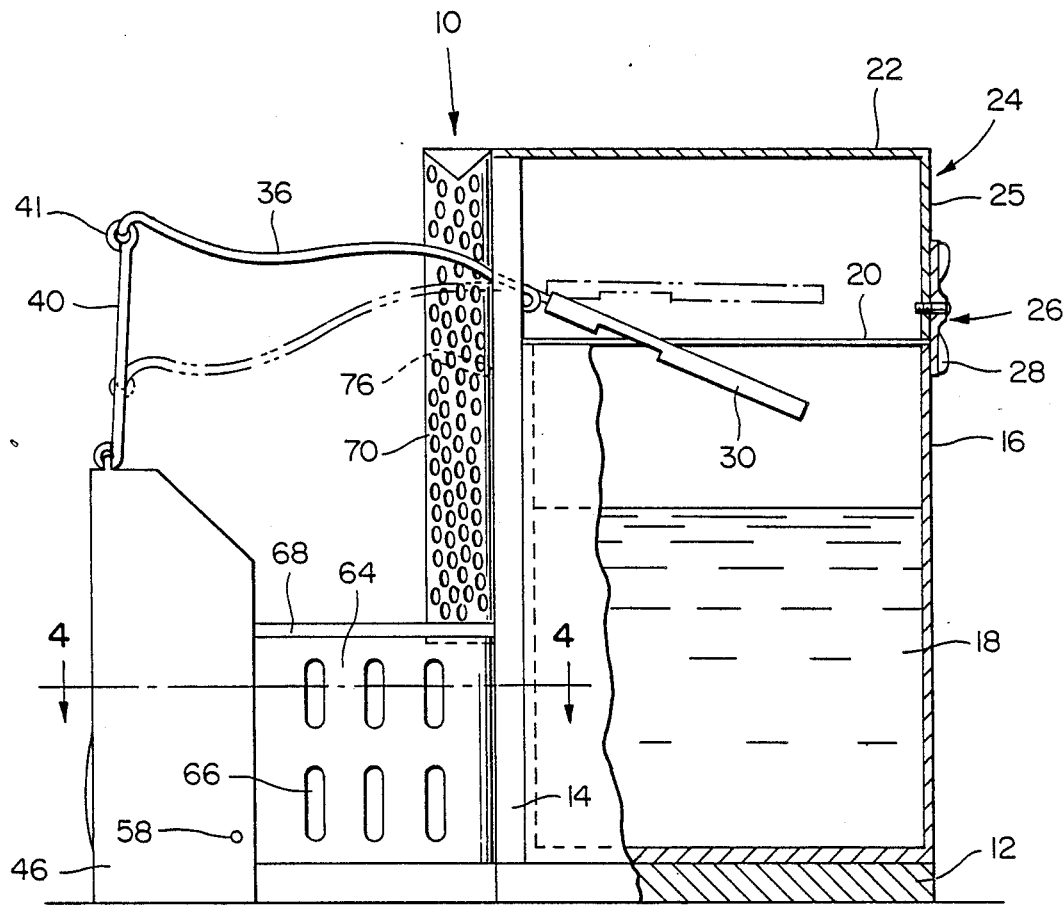
FIG. 1 is a side elevational view of the mousetrap, with portions shown in section, illustrating the relationship of the components.
Figure 4:
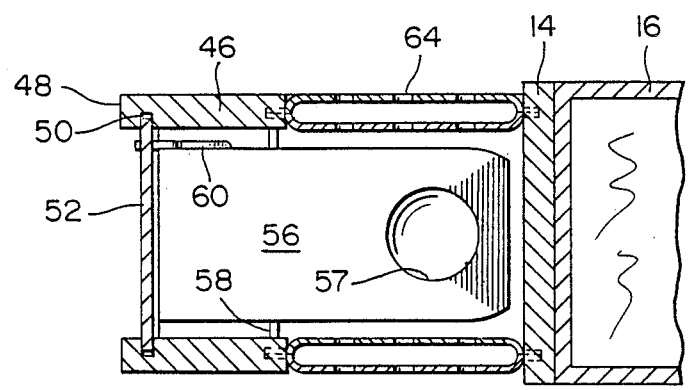
FIG. 4 is a transverse, sectional view taken substantially upon a plane passing along section line 4—4 on FIG. 1 illustrating additional details of the entrance structure of the mousetrap.
Figure 2:
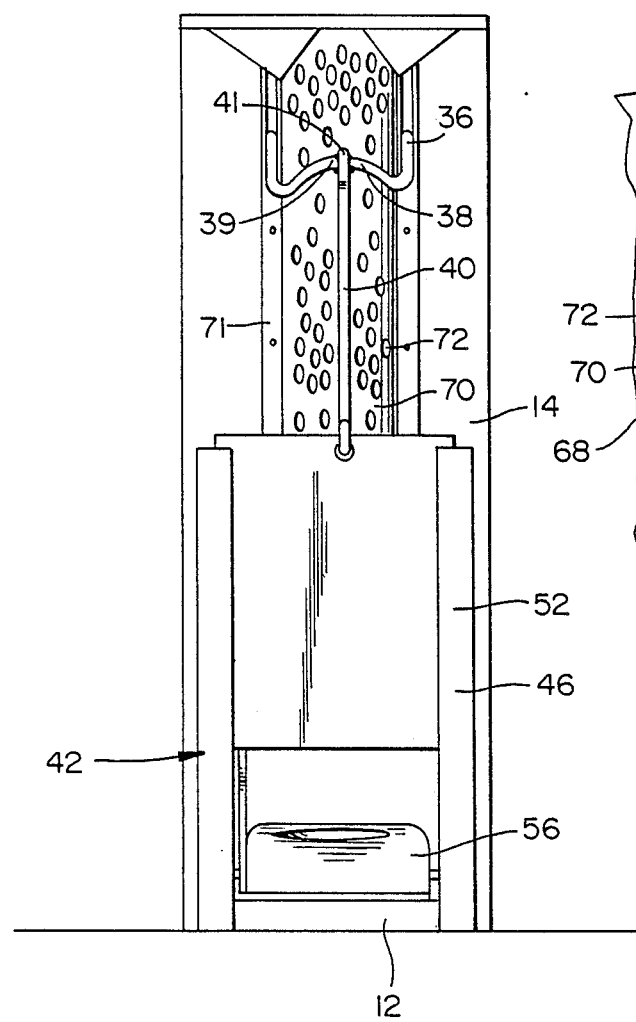
FIG. 2 is an elevational view of the mousetrap taken from the entrance end.
Figure 5:
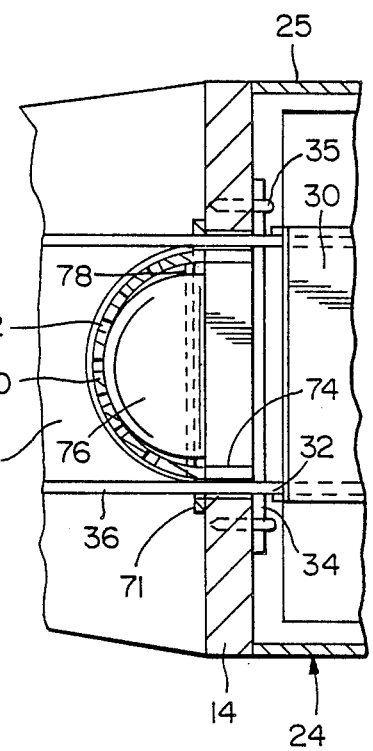
FIG. 5 is a transverse, sectional view taken substantially upon a plane passing along section line 5—5 on FIG. 3 illustrating details of the vertical tube and dumping platform.

Referring now more specifically to the drawings, the mousetrap of the present invention is generally designated by the reference numeral 10 and includes a supporting base 12 which may be of rectangular configuration and constructed of wood, metal, plastic or any other similar material. The base 12 includes an upstanding support mounted thereon in the form of a transverse wall 14. A removable tank or container 16 is also mounted on the base 12 against wall 14 and the tank has a quantity of water 18 or any other similar liquid therein. As illustrated, the tank or container 16 includes an upper end 20 that is spaced below a downwardly opening platform housing 24 which includes a peripheral wall 25 having a top wall 22 attached thereto. The wall 25 and top wall 22 are attached to the support wall 14 by the use of conventional fasteners (not shown). The housing 24 is the same shape and size as the container 16 and terminates generally in alignment with the open upper end 20 of the container or tank 16 with a latch or similar retainer 26 being provided to retain the tank 16 on the base 12 so it can be easily inserted against the wall 14 and supported on the base 12 and easily removed therefrom for emptying. The latch 26 includes a rotatable retainer 28 which engages the outer surface of the tank 16 and, when rotated, is positioned above the top of the tank 16 so it can be moved out from its supported position on the base 12 against the wall 14 for emptying, refilling with water and replacement. The retainer 28 could also be a hasp-type or slidable type retainer.

The platform housing 24 encloses a platform 30 which is normally horizontally disposed above the water 18 and is supported by a pair of wire arms 32 inserted into the end of the platform and secured thereto by offset areas 33. The arms 32 are hingedly attached to the vertical wall 14 for pivotal movement about a transverse axis by a hinge rod 34 rigid with arms 32 and having its ends received in staple-type fasteners 35 driven into wall 14. The wire arms 32 extend through the vertical wall 14 and curve downwardly as at 36 and extend outwardly and terminate in a transverse connecting member 38 which has a central depression 39 connected to a door elevating wire 40 which has an eye or loop 41 at its upper end.

Figure 3:
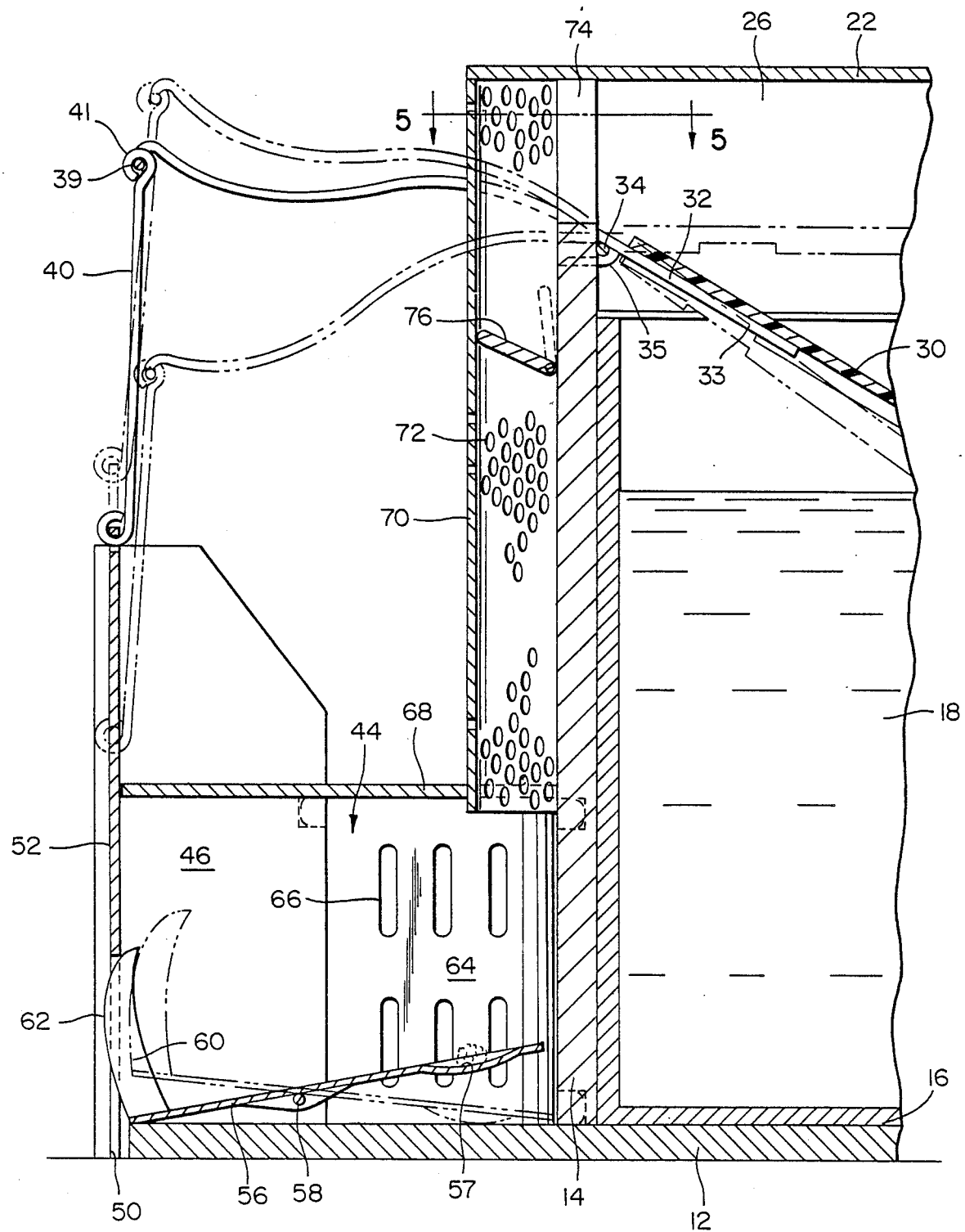
FIG. 3 is a fragmental, vertical, sectional view, on an enlarged scale, of the functional portions of the mousetrap.

The front end of the trap 10 includes an entrance area generally designated by numeral 42 and a bait box area generally designated by numeral 44. The entrance area is formed by a forward end of the base 12 being reduced in cross-sectional area and being provided with a pair of vertically extending door jambs or plates 46 which include vertical outer edges 48. The inwardly facing surfaces of the door jambs 46 are each provided with a vertical groove 50 adjacent the forward edge 48 for slidably receiving a door 52 in the form of a plate which has its upper end connected to an eye 54 at the lower end of the door lift wire 40 as illustrated in FIG. 3. As illustrated, the door jambs 46 extend vertically above the bait box area 44 and the grooves 50 also extend vertically above the bait box 44 so that movement of the door 52 will be guided throughout its vertical movement. The door is elevated by the platform 30 moving from horizontal position to downwardly inclined position as shown in broken lines in FIG. 3. This enables the mouse to enter the bait box area 44 onto an entrance platform 56 that is pivotally supported by pivot rod 58 supported from door jambs 46 with platform 56 including a recess 57 in the upper surface thereof to receive bait. The entrance end of the entrance platform 56 is provided with an upwardly extending end edge flange 60 having a curved outer edge 62. The end edge flange 60 and the curved outer edge 62 provides an area in which the mouse can enter the bait box area 44 under the elevated trap door 52. The weight of the mouse pivots the platform 56 to let the door 52 snap shut due to the weight of the door overcoming the weight of the platform 30 when the door is released by movement of the flange 60 which also returns platform 30 to horizontal position.

The bait box area 44 includes vertical side walls 64 which have the outer ends engaged with the door jambs 46 and their inner ends engaged with the wall 14. The side walls 64 are hollow and include slotted bait receiving areas 66 which are in the form of grates with the bait box area providing bait or food along both sides thereof. The side walls 64 are connected by a top wall 68 which extends between the inner surfaces of the door jambs 46 as illustrated in FIG. 3, thus providing a confined entrance area between the door jambs 46 and the side walls 64 of the bait box which form a continuation thereof and the top wall 68 which are continuous to the wall 14. The base 12 forms a bottom for the bait box area and the top wall 68 forms a top for the bait box area so that any mouse entering the mousetrap will be confined to the bait box area.

An escape tube 70 of semi-cylindrical configuration with outwardly extending flanges 71 secured to wall 14 by suitable fasteners extends upwardly from the top wall 68 of the bait box area 44 along the front surface of the wall 14 with this tube 70 being perforated or provided with roughened areas 72 on the inner surface thereof so that a mouse in the bait box area 44 can enter the open lower end of the escape tube 70 and climb upwardly therein. The upper end of the escape tube is closed by the top wall 22 and there is an opening 74 at the upper end of the wall 14 which communicates the interior of the escape tube 70 with the area of the platform housing 24 above the platform 30 so that a mouse climbing up the escape tube 70 can exit through the opening 74 onto the platform 30.

An escape tube lock or flap valve 76 is mounted in the escape tube 70 for pivotal movement about a transverse pivot rod 78 supported in the tube 70. The flap valve 76 is dimensioned so that it will be held closed by gravity in an upwardly inclined position as shown in FIG. 3 and when a mouse climbs up the escape tube 70, the flap valve 76 can swing upwardly to permit passage of the mouse and then will fall back downwardly towards a horizontal position to close the escape tube thereby preventing the mouse from exiting downwardly from the escape tube 70 back into the bait box. The only way out for the mouse once he passes upwardly past the flap valve 76 is through the opening 74 onto the top surface of the platform 30. The construction of the platform 30 is such that the weight of the mouse will overcome the weight of the door and cause platform 30 to pivot downwardly to a position to dump or drop the mouse from the platform into the water 18 in the tank 16. When this downward movement occurs, the arms 32 and lift wire 40 are all elevated by pivotal movement about pivot rod 34 thereby elevating the sliding door 52 to its open position with the door being retained in elevated position by the flange 60 on the end of the side edge of entrance platform 56 engaging the lower edge of the door 52 thus conditioning the mousetrap for receiving another mouse by automatically resetting the mousetrap to trap another mouse. When a second mouse enters the trap, his weight will pivot platform 56 with the inner end moving downwardly so that the flange 60 releases door 52 which drops to closed position to trap the mouse and return platform 30 to horizontal position. The capacity of the tank may vary depending upon the size requirements and the water level therein with it usually being necessary to provide a capacity to catch only four or five mice since it is desirable to dump the water and the dead mice from the tank at periodic intervals and clean the tank and refill it with clean water.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A mousetrap comprising a base for engaging a supporting surface, an upright wall disposed generally centrally and transversely of the base to form a partition extending vertically upwardly from the base, a container for water positioned on the base in engagement with one surface of the wall, a pivotal platform mounted on the wall vertically above the upper end of the container with the platform extending over the upper end of the container, said container including an open upper end to enable the platform to swing downwardly toward the open upper end of the container and discharge a mouse on the platform into water in the container, a downwardly opening platform housing mounted on the wall and enclosing the top and side surfaces of the platform and terminating adjacent the upper edge of the container to form a continuation thereof and preclude mice from exiting the platform and container, entrance means on the base extending from the wall in opposed relation to the container, said entrance means including an openable and closable door, bait means positioned inwardly of the door and a tube extending from the bait means to the platform by which a mouse entering the door into the bait means can only exit through the tube when the openable door is closed after entry of a mouse whereby a mouse will exit onto the upper surface of the platform and be dumped into the water as the platform swings downwardly by the weight of the mouse.

2. The structure as defined in claim 1 wherein said door is vertically slidably mounted in a pair of vertical door jambs with each door jamb including an inwardly facing groove receiving the side edges of the door, linkage mechanism interconnecting the door and platform to actuate the door in response to movement of the platform, said linkage means including wire arm members connected to the platform.

3. The structure as defined in claim 2 wherein said bait means includes a horizontally disposed bait housing communicating with the area between the door jambs that is closed by the vertically movable door, means in the housing to retain bait for enticing mice into the bait housing through the doorway between the jambs.

4. The structure as defined in claim 3 together with an entrance platform in the bait housing adapted to be pivoted about a transverse axis by the weight of a mouse entering the bait housing, said door forming a closure for the open end of the bait housing to prevent exit of a mouse whereby a mouse can only exit through the vertically extending tube attached to the wall, an aperture in the upper end of the wall, said tube communicating with the aperture to provide a passageway for a mouse and one-way flap valve means in the tube to prevent downward movement of the mouse in relation to the tube after the mouse has moved vertically to the uppermost end thereof.

5. The structure as defined in claim 4 wherein said tube is provided with a grip enhancing surface to enable a mouse to obtain a grip for climbing.

6. The structure as defined in claim 5 wherein said tube is generally of U-shaped cross-sectional configuration having outwardly extending flanges secured to the vertical wall.

7. The structure as defined in claim 6 together with means on the platform housing selectively engaging the outer surface of the container to retain the container in alignment with the platform housing.

8. The structure as defined in claim 7 wherein the entrance platform is provided with an upwardly extending edge flange at its outer end having a curved outer edge for engagement by the lower edge of the vertically movable door to retain the door in elevated position until the inner end of the entrance platform is pivoted downwardly by the weight of the mouse which releases the door to enable it to close by gravity.

* * * * *